United States Patent
Divo et al.

(10) Patent No.: US 9,759,934 B2
(45) Date of Patent: Sep. 12, 2017

(54) METHOD FOR MEASURING MORPHO-GEOMETRIC PARAMETERS OF A SPECTACLE WEARING INDIVIDUAL

(71) Applicant: Essilor International (Compagnie Generale d'Optique), Charenton-le-Pont (FR)

(72) Inventors: Fabien Divo, Charenton-le-Pont (FR); Gaetan Hasbroucq, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 32 days.

(21) Appl. No.: 14/345,991

(22) PCT Filed: Sep. 18, 2012

(86) PCT No.: PCT/FR2012/052081
§ 371 (c)(1),
(2) Date: Mar. 20, 2014

(87) PCT Pub. No.: WO2013/045789
PCT Pub. Date: Apr. 4, 2013

(65) Prior Publication Data
US 2014/0240664 A1    Aug. 28, 2014

(30) Foreign Application Priority Data
Sep. 28, 2011 (FR) .................................. 11 58664

(51) Int. Cl.
*G02C 13/00* (2006.01)

(52) U.S. Cl.
CPC .................................. *G02C 13/005* (2013.01)

(58) Field of Classification Search
CPC ............... G02C 13/005; G02C 13/003; H04N 5/23248; A61B 3/11; A61B 3/111; A61B 3/112; G03B 5/00
(Continued)

(56) References Cited

U.S. PATENT DOCUMENTS 6,257,721 B1 * 7/2001 Hayashi ................. A61B 3/112
351/204
2008/0300010 A1  12/2008 Border et al.
(Continued)

FOREIGN PATENT DOCUMENTS

WO    WO9903278    1/1999

*Primary Examiner* — Scott J Sugarman
*Assistant Examiner* — Henry Duong
(74) *Attorney, Agent, or Firm* — Young & Thompson

(57) ABSTRACT

A method for measuring at least one geo-morphometric parameter of an individual wearing glasses that includes adjusting the inclination of the image acquisition system so that it lies in an acceptable angular range; adjusting the height of the image acquisition system so that the individual can see the target along a substantially horizontal line of sight; observation of the target, by the individual; acquiring at least one image of the eyes of the individual and of the frame. The method includes processing the at least one image using the processing unit in order to determine each geo-morphometric parameter of the individual from the position of their pupils and the inclination of their glasses and returning the result of the measurements.

16 Claims, 2 Drawing Sheets

(58) Field of Classification Search
USPC .............................................. 351/204, 208.7
See application file for complete search history.

(56) References Cited

U.S. PATENT DOCUMENTS

| | | | | |
|---|---|---|---|---|
| 2008/0309772 A1* | 12/2008 | Ikeda | ........................ | G03B 5/00 |
| | | | | 348/208.7 |
| 2010/0195045 A1* | 8/2010 | Nauche | ................ | G02C 13/005 |
| | | | | 351/204 |
| 2011/0058053 A1* | 3/2011 | Roh | ..................... | H04N 5/2258 |
| | | | | 348/218.1 |
| 2011/0273731 A1* | 11/2011 | Haikin | .................... | G06F 3/013 |
| | | | | 358/1.9 |

* cited by examiner

METHOD FOR MEASURING MORPHO-GEOMETRIC PARAMETERS OF A SPECTACLE WEARING INDIVIDUAL

RELATED APPLICATIONS:

This application is a National Phase Application of PCT/FR2012/052081, filed on Sep. 18, 2012, which in turn claims the benefit of priority from French Patent Application No. 11 58664 filed on Sep. 28, 2011, the entirety of which are incorporated herein by reference.

BACKGROUND

Field of the Invention

The technical field of the invention relates to methods for measuring morpho-geometric parameters of a spectacle wearing individual. These parameters may, for example, include the pupillary distance PD, the height H separating the pupil from the lower edge of a glass, the pantoscopic angle ΘP, which is the angle of inclination of the glasses relative to the facial plane of the individual, the distance DVO between the eye and the glass V, and the center of rotation CRO of the eye. Knowledge of these parameters is essential if a pair of spectacles, and in particular a pair of progressive glasses, is to be correctly personalized.

Description of Related Art

Methods allowing a certain number of these morpho-geometric parameters to be measured already exist. A first category of these methods employs a large vertical measuring column, with a video camera adjusted to eye height, the spectacle wearing individual looking into a mirror. This type of apparatus is very bulky and therefore a large room is required to carry out the measurements, furthermore it is relatively inflexible operationally insofar as it may neither be moved easily in order to refine the measurements, nor disassociated into a number of elements in order to be adapted to a given situation or environment.

A second category of methods, which is for example described in patent US 2010/195045, involves a measuring tablet able to measure the heights and the pantoscopic angle, the angle of inclination of the tablet being used to correct the values of said heights and said pantoscopic angle. However, such methods do not return very precise height and pantoscopic angle values if the angle of inclination of the tablet is too high. Specifically, they are completely satisfactory only for very small angles of inclination of the tablet, greatly limiting the number of possible measuring configurations and therefore impacting the operational flexibility of this tablet. Methods employing a tablet with limited functionality have their ergonomics compromised.

Objects and Summary

The methods for measuring morpho-geometric parameters according to the invention employ an apparatus that is both operationally flexible and able, easily and rapidly, to take precise and reliable measurements of said parameters, while preventing the spectacle wearing individual from having to tolerate even the slightest discomfort. Specifically, throughout the method the individual adopts a comfortable posture, with a natural inclination of the head, without ever having to tolerate a measurement protocol requiring them to adopt repetitive and uncomfortable postures, or ever having to wear additional equipment necessary for taking measurements. The methods according to the invention are also designed to return the results of the measurements automatically and rapidly. They are therefore reliable, precise and rapid while remaining operationally flexible and ergonomic.

In the rest of the description, the terms "spectacles", "pair of spectacles" or "frame" are understood to be equivalent.

One subject of the invention is a method for measuring at least one morpho-geometric parameter of a spectacle wearing individual, said method employing a stand-alone information-processing device comprising a screen, a target, a compact image-acquisition system provided with a means for determining its inclination and connected to said screen, and a processor allowing the image-acquisition system to be controlled and the images obtained to be processed. The principal feature of a measuring method according to the invention is that it comprises the following steps:

adjusting the inclination of the image-acquisition system so that it remains in a permissible angular range, said image-acquisition system being equipped with a device for compensating for its inclination, so as to obtain an image of the eyes of the individual, which image is always centered on the screen whatever the inclination of said system in the permissible angular range;

adjusting the height of the image-acquisition system so that the individual can view the target along a substantially horizontal vision axis;

the individual observing the target in a comfortable position that requires no particular effort to adopt, the spectacles occupying a natural position on the face of the individual;

acquiring at least one image of the eyes and of the frame in said observation position by means of the image-acquisition system;

processing said at least one image using the processor in order to determine each morpho-geometric parameter of the individual from the position of their pupils and the inclination of their spectacles; and returning the results of the measurements.

The principle behind a measuring method according to the invention consists in adjusting, as precisely as possible, the image-acquisition system, in order to make it possible for the spectacle wearing individual to place themselves comfortably and unconstrainedly in front of said image-acquisition system while said method is carried out. The image-acquisition system may comprise at least one camera or at least one video camera. The inclination of the axis of the image-acquisition system must be known with precision especially in order to correct parallax errors due to this inclination, and which could corrupt the measurements. The term "compact" attributed to the image-acquisition system means that said system is small in size, and that it may be easily handled in order to be placed on an everyday piece of furniture such as a table or desk, and/or to be inclined. The target is preferably borne by the image-acquisition system in order to simplify the equipment employed to carry out the measuring method according to the invention. Advantageously, the target is positioned at substantially the same height as the image-acquisition system, and must form an identifiable point that the individual may easily focus on with their spectacles, even without their habitual correction. It may take the form of a specific added pattern, having a shape, a color and/or a visible relief, but it may also be a constituent element of the image-acquisition system having a very specific function, such as a flash or the lens of a video camera and/or of a camera. The images taken by the acquisition system must mainly show the frame of the spectacles, positioned relative to the eyes of the individual. Specifically, all the information required to carry out information-processing of the images in order to obtain the sought-after parameters must appear dearly in said images, via the spatial position of said frame relative to the eyes of the individual.

It is therefore essential that both the frame and the eyes of the individual appear clearly and precisely in the images. The morpho-geometric parameters are then easily deduced from said photos using everyday trigonometric relationships. The inclination of the image-acquisition system must be limited to a permissible angular range, if not the measurements will be biased by introducing an excessively large angular offset. Said image-acquisition system is assumed to be preprogrammed to operate in this permissible angular range, and outside of this range it is assumed that it can no longer acquire images. Thus, the person handling the image-acquisition system no longer needs to worry about its inclination. The frame may optionally be provided with a referencing means taking the form of a clip equipped with markers, in order to allow its precise orientation in space in an image and its inclination to be viewed. The main function of the screen is to allow images taken by the acquisition system to be viewed. The screen may also be used to return the results of the measurements of the sought-after morpho-geometric parameters. The method may be carried out either by the spectacle wearing individual themselves, or by an operator, possibly an optician. It is assumed that the screen possesses a visible central zone, in which the acquired image must be displayed, in order for the latter to be entirely exploitable. This active compensation of the inclination, which allows the eyes and the frame to be positioned, in real time, in the central zone of the screen provided for this purpose, makes large-amplitude inclination of the image-acquisition system, in the permissible angular range, possible because this compensation removes the risk that all or part of the image will leave the display screen. The compensation device is based on an image-processing software package that selects, in the image obtained by the acquisition system, in which image the face of the individual appears off-center, the zone around the eyes and the frame of the individual, and moves said zone to the center of said screen.

Preferably, the compensation consists in moving each image obtained by the acquisition system to the center of the screen, the direction and the amplitude of movement of each of said images being dependent on the direction of inclination of the acquisition system and on the value of the angle of inclination.

Preferably, the permissible angular range is plus or minus 10° about a vertical reference position. The reference position of the image-acquisition system is assumed to be a vertical position for which the central sight axis of said system is horizontal. Advantageously, the permissible inclination range is comprised between 2° and 8°, in one direction or the other.

Advantageously, the spectacles of the individual are equipped with a clip provided with at least one marker, and the inclination of the frame is evaluated using a single video camera. Specifically, the clip, which is provided with markers, allows the inclination of the frame on the face of the individual to be viewed with precision. In this case, only one video camera is required to determine this inclination, from the dimensional characteristics of said clip in the image captured by the video camera. It is assumed that said video camera forms an integral part of the image-acquisition system employed in the method according to the invention.

According to another preferred embodiment of a method according to the invention, the inclination of the frame is evaluated by means of two video cameras used in stereoscopic mode. For this configuration, two separate video cameras, placed in two different locations and each filming the frame, allow the inclination of said frame to be determined without recourse to a marking clip. For this configuration it is assumed that the two video cameras belong to the image-acquisition system employed in the method.

Advantageously, the means for determining the inclination of the image-acquisition system is an inclinometer housed in said system.

Preferably, the information-processing device is provided with an alarm that is triggered when the angle of inclination of the acquisition system departs from the permissible angular range. This alarm may be an audible or visual alarm, and may take any form, the most important thing being for the person using the image-acquisition system to be made aware of the fact that they cannot take images when this alarm is activated. It is preferable for this alarm to appear on the image-acquisition system, so that the person handling this system receives the warning directly and instantaneously. The alarm may for example consist of a constant or flashing colored light that appears on the screen. It could also take the form of an identifiable sound, which would be triggered once the system was inclined too far.

Preferably, the morpho-geometric parameters measured by means of a method according to the invention are to be chosen from the group consisting of the height between the pupil and the lower rim of the glass, the pantoscopic angle, the face form angle of the spectacles and the pupillary distance.

According to one preferred embodiment of a method according to the invention, said method is implemented by the spectacle wearing individual, who adjusts the position of the image-acquisition system with reference to the pictures displayed by the screen, and utilizes the processor to trigger the image capture and the processing of said images. Specifically, the measuring method according to the invention may be carried out by a spectacle wearing individual possessing a suitable information-processing device. This device could be a home computer equipped with a webcam, an inclinometer and a suitable image-processing software package.

According to another preferred embodiment of a method according to the invention, said method is implemented by an optician placed facing the individual, and who utilizes the image-acquisition system to adjust its position in space, the optician guiding the individual and using the processor to trigger the image capture and the processing of said images. In this embodiment, the constituent elements of the information-processing device are arranged differently than when implemented by a single person. Specifically, the optician must have access to the screen and to the image-acquisition system, in order to adjust the position of said system depending on the images appearing on said screen. As for the spectacle wearing individual, they must position themselves facing said image-acquisition system following the instructions of the optician, who guides them through all the steps of the method.

Advantageously, the results of the measurements are displayed on the screen. Specifically, it is important, to improve the ergonomics of the method according to the invention, for the results of the measurements to appear rapidly and directly on a visual medium that can be read easily and unambiguously by the spectacle wearing individual and/or the optician. Other means may also be used, such as a printed document printed by a printer connected to the processor.

Preferably, the method comprises a step of adjusting the distance between the image-acquisition system and the face of the individual, so as to ensure that this distance lies in an acceptable range. Although the measuring method according to the invention has a certain operational flexibility, it remains limited in terms of the distance separating the individual and the image-acquisition system. Specifically, the face of the individual, essentially represented by their eyes, and the frame of the spectacles that they are wearing must occupy a certain zone of the screen, and with sufficient resolution to allow certain details of said face and said frame to be pinpointed. However, beyond a certain distance the face will be badly positioned on the screen or will be too small, the resolution then not being high enough to identify the sought-after details. It is therefore important to control this distance.

The invention also relates to an information-processing device for implementing a method according to the invention. The main feature of an information-processing device according to the invention is that it comprises a processor, a target, at least one video camera equipped with an inclinometer, and a display screen allowing the pictures taken by each video camera and the results of the measurements to be viewed. This measuring device is equivalent to a measuring kit, in which the various parts are connected to one another in order to interact and deliver the desired measurements, without necessarily being restricted to a particular arrangement. Specifically, this type of device has a certain flexibility in terms of its setup, in contrast to a fixed column, and may therefore be easily installed in any type of environment, whether it is on a table or a desk or quite simply on the ground. The processor allows pictures to be taken at the desired times, and also makes it possible for the images obtained to be processed. Preferably, the target is borne by the image-acquisition system.

Preferably, the position of the video camera and the position of the screen may be adjusted independently of each other.

Advantageously, the measuring device consists of a tablet combining the screen, a secondary video camera, the inclinometer and the processor, and of said at least one video camera. This version of the device is one of the most compact, and it may therefore be installed in a small space. Combining various constituent parts of the device in a small tablet further increases the operational flexibility of the measuring device, because an individual or an operator may carry out the method in its entirety using one and the same object, and make the necessary adjustments without having to reposition themselves, or move the parts relative to one another. A tablet is assumed to be an object the small size of which is compatible with easy manual handling by an individual or an operator. This type of object may, in particular, be easily moved manually in a room, in order to be installed in a precise location and to be oriented in the desired direction. This tablet may possess a touch screen, or more conventionally be operated by means of a mouse. It may also comprise at least two video cameras in order to carry out stereoscopic parameter measurements, such as a measurement of pantoscopic angle for example. The video camera may be fastened directly to this tablet, or to a stand allowing said tablet to be supported.

Methods for measuring morpho-geometric parameters of an individual according to the invention have the advantage of being particularly ergonomic and user-friendly for a spectacle wearing individual, insofar as the latter does not need to wear additional equipment and does not have to adopt a series of repetitive and constraining postures. Everything is organized so that the spectacle wearer passes through the various steps of the method while keeping a natural and comfortable posture. In addition, methods according to the invention have the advantage of instantaneously returning, to the individual or the optician, the results of the measurements, either by way of a screen or by way of any other means able to clearly and instantaneously deliver this information. Lastly, the measuring device employed in a method according to the invention has the advantage of being small in size and therefore easily adjusted and/or installed in a small room, on a table or on a desk.

BRIEF DESCRIPTION OF THE DRAWINGS

A detailed description of a preferred embodiment of a measuring method according to the invention is given below with reference to FIGS. 1 to 5.

DETAILED DESCRIPTION

Figure 1:
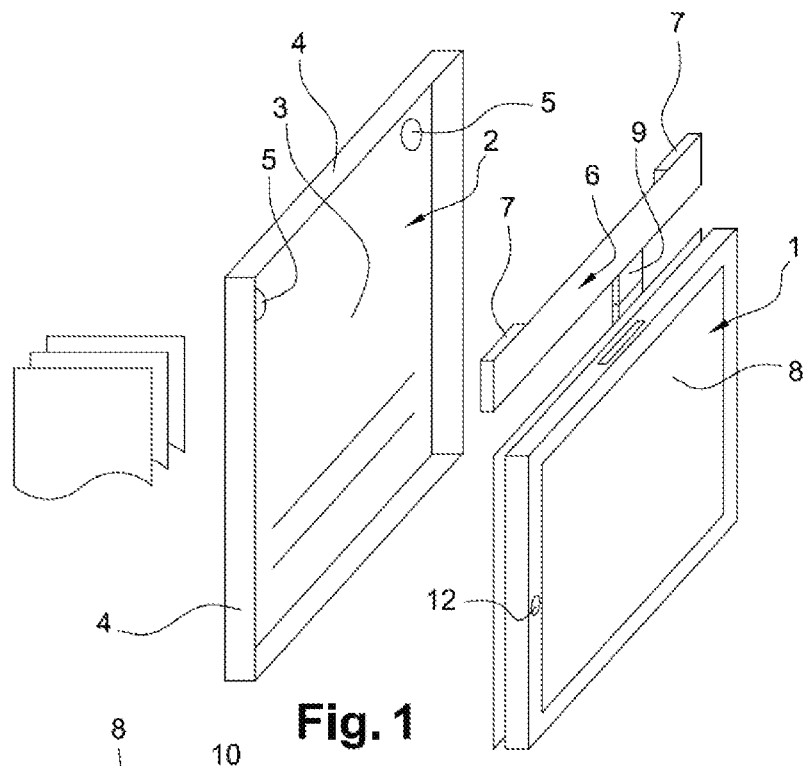
FIG. 1 is a schematic exploded view of a measuring tablet according to the invention.

With reference to FIG. 1, an information-processing device according to the invention, allowing a method for measuring morpho-geometric parameters according to the invention to be implemented, consists of a tablet 1 able to be inserted into a rigid protective case 2. This case 2 has a flat, rectangular main wall 3 bounded by four perpendicular edges 4, said wall 3 and said edges 4 defining a rectangular container. The main wall 3 contains two holes 5. The tablet 1 has a thin rectangular parallelepipedal shape, and is surmounted by an elongate rod 6 that runs parallel to one of its two long sides. This rod 6 serves to support two video cameras 7 placed at its two ends with respect to a longitudinal axis of said rod 6, and, once the tablet 1 has been housed in its protective case 2, the two video cameras 7 face the two holes 5 in the main wall 3 of said case 2. The tablet 1 comprises a screen 8 allowing, on the one hand, the images taken by the video cameras 7 to be viewed, and, on the other hand, the results of the measurements to be displayed. The elongate rod 6 is orientable in rotation about an axis connecting said rod 6 to the tablet 1, this axis 9 being perpendicular to the longitudinal axis of the rod 6, and to the long sides of the rectangular tablet 1. In this way, the video cameras may, for example, be oriented in the same direction as the screen 8 or in the opposite direction to this screen 8. Thus, the first configuration will be more suitable for a single person desiring to perform the parameter measurement themselves, The other configuration, in which the video cameras 7 and the screen 8 face in opposite directions, will used in the case where an optician would like to perform measurements on a spectacle wearing individual. The video cameras 7 have a high resolution, which is advantageously higher than 1 million pixels, in order to make it possible to correctly identify in an image all the details of the eyes and the frame of the wearer. Measurements of the pantoscopic angle and/or of the height connecting the pupil of each eye to the lower edge of the glasses may be carried out, by means of a method according to the invention, in two different ways: either by means of two video cameras 7 incorporated into the tablet 1 and used in stereoscopic mode; or by means of a single video camera 7 and a clip fastened to the frame of the individual, said clip being provided with markers and allowing the scale of the image and the precise orientation of the frame in space to be determined. The tablet 1 combines a processor able to trigger the or both video cameras in order to obtain the desired images, and a software package for processing said images in order to obtain the value of the measured and corrected parameters. The tablet 1 may have a touch screen and be controlled by pressing the screen with a finger, level with a suitable icon. However, it may also be controlled more conventionally by means of a mouse. It is also provided with an inclinometer allowing, at any moment, and in particular during image-capture phases, its inclination to be determined. Knowledge of the angle of inclination of the tablet 1 is essential when determining morpho-geometric parameters since this angle will influence the value of said parameters, and hence it will therefore be necessary to introduce a corrective parameter taking its amplitude into account. The tablet 1 is preprogrammed to be used in a given inclination range, preferably between 0 and plus or minus 6°, so as not to too greatly bias the measurements by introducing errors that are too large. Specifically, if it is assumed that the reference position of the tablet 1 is a vertical plane corresponding to a direction where the sight of the video cameras 7 is horizontal, this tablet 1 may therefore be inclined by a maximum angle of 6°, either backwards or forwards. In the case where the person handling the tablet 1 exceeds this maximum permitted angle, a luminous indicator will appear on the image on the screen, and the measuring process will be deactivated. The tablet 1 is also equipped with a means for compensating for its inclination, allowing it to center the captured image on the screen whatever its angle of inclination. This compensating operation is instantaneous, so that the person handling the tablet 1 in the preprogrammed inclination range will always obtain an image centered on the screen of the eyes and the frame 10 of the individual undergoing the method.

Figure 2:
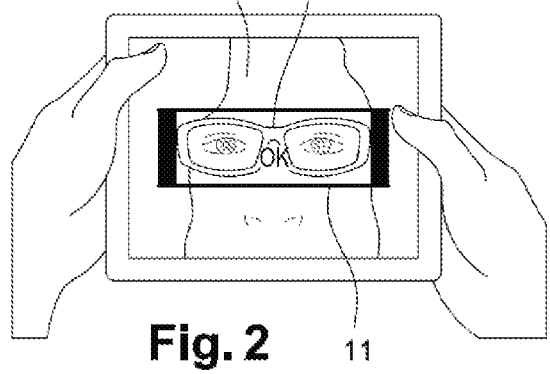
FIG. 2 is a front view of a tablet according to the invention showing an example of an exploitable image in landscape mode.
Figure 3:
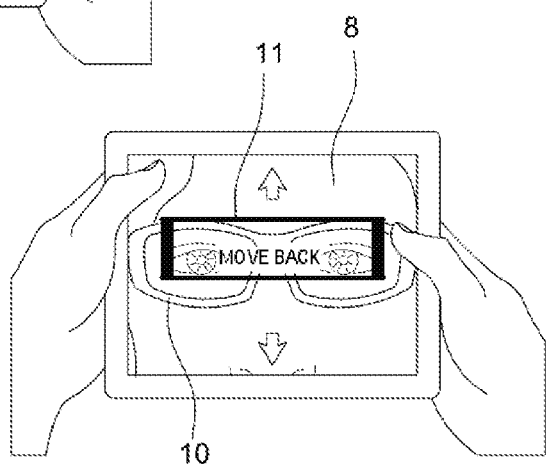
FIG. 3 is a front view of a tablet according to the invention showing an example of an image that is too large, in landscape mode.

With reference to FIGS. 2 and 3, adjustment of the images is carried out by way of an enclosure 11 appearing on the screen. This enclosure 11 takes the form of a rectangle of constant size, and, if the adjustment of the tablet 1 is satisfactory, as shown in FIG. 2, the frame 10 and the eyes of the individual must fit inside this reference enclosure 11. If the adjustment is unsatisfactory, in the case for example where the tablet 1 is too close to the spectacle wearing individual, as shown in FIG. 3, the frame 10 does not fit into this enclosure 11. It is then recommended to retract the tablet 1 so that the frame 10 fits within this enclosure 11. The tablet 1 may also be provided with a target 12, taking the form of a colored and/or raised mark placed near the video cameras, said target 12 forming a point on which the individual can focus their gaze during the method. The target 12 is preferably placed at the same height as the video cameras 7. Lastly, the tablet 1 may also possess a flash in order to improve the lighting conditions of the pictures, in order to make certain details of the face, such as for example the pupil of the eyes, and the position of the frame 10, appear more clearly in the images.

The tablet 1 just described allows a method according to the invention to be implemented, the objective of said method being the measurement of certain morpho-geometric parameters. Such a method comprises the following steps. This is a preferred but nonlimiting embodiment, certain of the steps described could be removed or switched with other steps.

An optician orients the tablet 1 so as to be able to observe the screen 8 and so as to he able to easily activate the controls of the latter. The two video cameras 7 are placed on the back of said tablet 1 behind the screen 8, and may take images of a spectacle wearing individual 10 positioned facing the optician and in front of the video cameras 7.

First of all the optician adjusts the distance between the face of the individual and the tablet 1 so that their eyes and the frame 10 fit into the enclosure 11 on the screen. The tablet 1 displays this distance in real time, either by way of a value, or by way of a graphic allowing it to be ensured that the distance range is correct. Measurement of the distance is carried out conventionally by stereographic measurement and determination of correspondences between points of the two video cameras 7. The distance measurement zone, corresponding to the enclosure 11, is limited in order to enable rapid measurement. It will be noted that the tablet 1 is preferably used in portrait mode.

Next, if necessary, the optician adjusts the inclination of the tablet 1 in the permissible range, which is, for example, comprised between +6° and −6°. However, the angles of inclination must not exceed limiting values, otherwise the measurements will contain errors that are too large. In order to correctly measure pantoscopic angle for example, it is necessary for the gaze of the individual observing the target to be horizontal. A first solution would consist in orienting the tablet 1 with a small inclination, but this would place substantial ergonomic constraints on the optician. In addition, the positioning error of the target 12 on the horizontal vision axis will not be completely zero, and therefore pantoscopic angle measurement errors would still exist. Another solution, which is preferred for the measuring method according to the invention, is to provide active compensation of the inclination of the tablet 1, in order to make a fairly wide range of inclination of the tablet 1 possible. In this way, the optician will only have to verify that the tablet 1 is in the acceptable inclination range to know that the inclination adjustment is satisfactory. Details of the principle behind this active compensation are given in the last part of the description below, Once the inclination of the tablet 1 has been adjusted, all that remains to be done is to adjust the height of said tablet 1 so that the individual is looking at the target 12 along a substantially horizontal direction, and so that their eyes and the frame 10 appear in the middle of the screen 8, in the guiding enclosure 11. The height adjustment is thus satisfactory when the eyes 27 of the individual are centered on the screen 8.

When the tablet 1 has had its height and inclination adjusted, and the measuring distance has been fixed, the optician asks the individual to look naturally and unconstrainedly at the target 12 of the tablet, and then triggers the video cameras 7 which each simultaneously acquire a photo of the eyes and of the frame 10 of the individual. These 2 high-resolution photos will be used to measure with precision the distance between the video camera 7 and each of the points on the face and frame 10, using the principle of stereoscopic vision. The flash is used to improve the lighting conditions.

The optician then activates the image-processing software package of the processor included in the tablet 1, in order to measure the morpho-geometric parameters used to personalize the ophthalmic glasses, from the two acquired photos. Specifically, the principle of stereoscopic measurement allows the three-dimensional coordinates of various characteristic points of the face and of the frame 10 to be determined in the frame of reference of the tablet 1. In this way, it is possible to measure, for example, the pupillary distance, the height between the lower edge of the frame 10 and the pupil, the pantoscopic angle, and the face form angle of the frame 10.

The principle of the active compensation is the following. It is assumed that the measuring distance, the position of the target 12 and of the video camera 7 on the tablet 1 in adjustment mode of said tablet 1 are known, Likewise, the angle of inclination of the tablet 1 is known by way of the inclinometer.

First Case: Zero Angle of Inclination.

Figure 4:
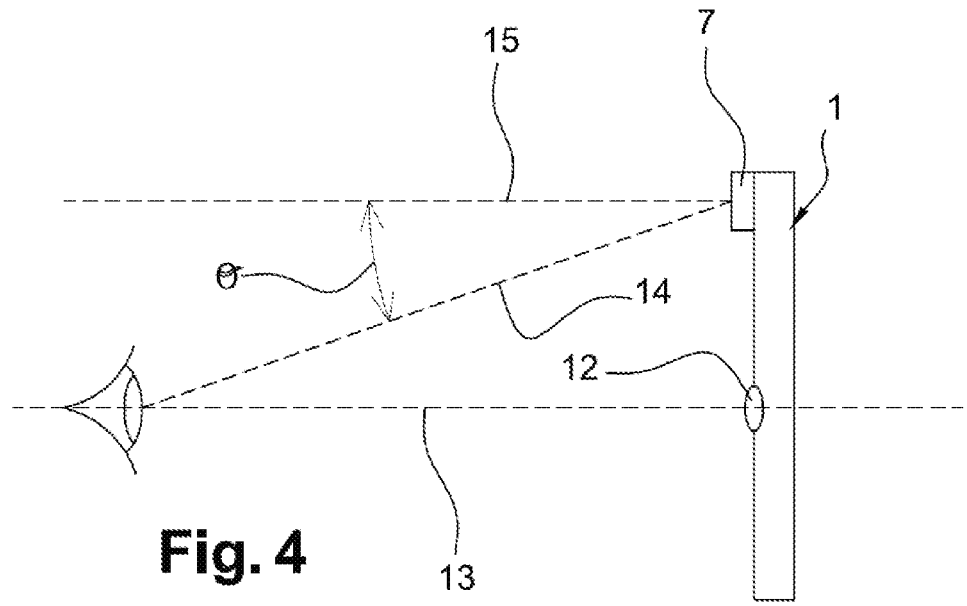
FIG. 4 is a schematic side view showing the eye of a spectacle wearing individual and a tablet the plane of which is vertical, the individual looking at a video camera on the tablet.
Figure 5:
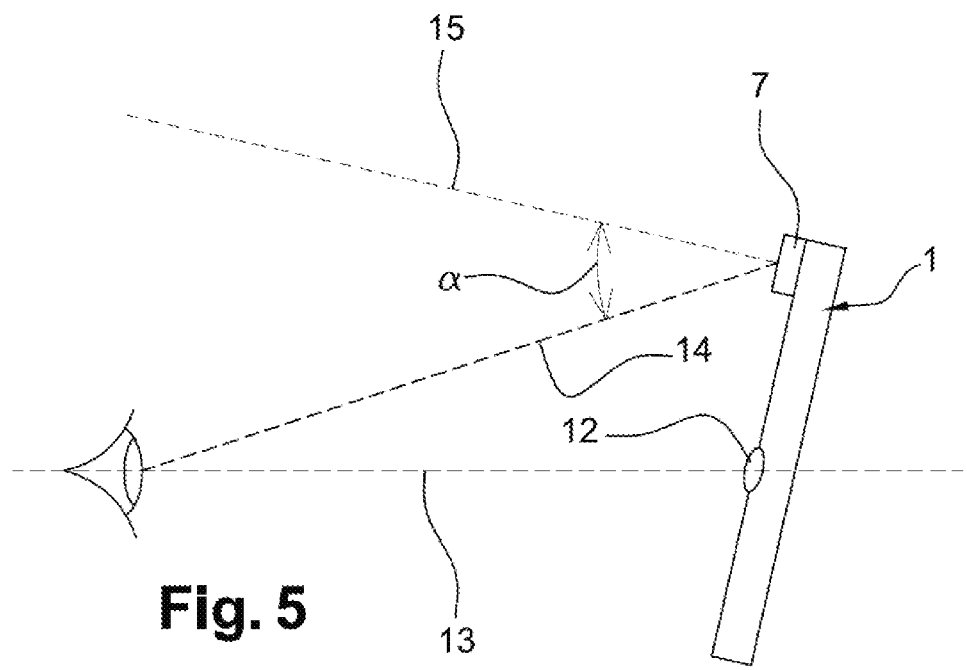
FIG. 5 is a schematic side view showing the eye of a spectacle wearing individual and a tablet the plane of which is inclined relative to a vertical plane, the individual looking at a video camera on the tablet.

With reference to FIG. 4, if the angle of inclination is zero, and if the gaze axis 13 is horizontal when the target 12 is observed, then the axis 14 passing through the video camera and the eyes of the wearer makes an angle θ with the sight axis 15 of the video camera 7. An image zone is then defined, by being extracted from the complete image from the video camera 7, and which zone is centered on the axis 14 connecting said video camera 7 to the eyes of the wearer. This zone is displayed on the screen 8, and the pixel corresponding to the axis 14 connecting the eyes of the wearer to said video camera 7, which makes an angle θ with the sight axis of the video camera 7, will therefore be the pixel at the center of the screen 8.

Thus, if the eyes are displayed in the center of the screen 8, this means that the vision axis is horizontal. In the contrary case, the operator must raise or lower the tablet 1 in order to bring the eyes to the center of the screen 8, while keeping the angle at 0°, which is constraining and difficult to achieve in practice.

Second Case: Non-zero Angle of Inclination

In this case, if the vision angle is horizontal then the axis 14 connecting the eyes of the wearer to the video camera 7 makes an angle a with the sight axis 15 of said video camera 7.

In addition:

$$a = \theta + \text{angle of inclination of the tablet 1}$$

Next, an image zone centered on the axis 14 connecting the eyes of the wearer to said video camera 7 is extracted from the complete image obtained by the video camera 7, and this image zone is displayed on the screen 8, the pixel corresponding to said axis 14 being the pixel at the center of the screen 8. Thus, for the angle of inclination of the tablet 1 considered, having the eyes displayed in the center of the screen 8 provides a guarantee that the vision axis is indeed horizontal. In practice, for each image taken by the video camera(s) 7, the angle of inclination of the tablet 1 is determined, and allows, each time, an image zone of the complete image delivered by the video camera 7 to be defined, this zone being displayed in real time on the screen 8. Thus, whatever the angle of inclination of the tablet 1, display of the eyes in the center of the screen 8 is a guarantee that the vision axis of the wearer is horizontal. By virtue of this compensation effect, the optician no longer needs to worry about adjusting or maintaining this angle of inclination. All they have to do is ensure that the measuring distance is correct, and that the eyes are in the center of the screen 8 by adjusting the height of the tablet 1.

It will be noted that extraction of morpho-geometric parameters such as, for example, the heights and the pupillary distance, is carried out in the conventional way of the method described in patent US 2010/195045.

The invention claimed is:

1. A method for measuring at least one morpho-geometric parameter of an individual wearing spectacles, said method employing a stand-alone information-processing device having a screen, a target, an image-acquisition system provided with a means for determining an inclination of the image-acquisition system and connected to said screen, and a processor allowing the image-acquisition system to be controlled and the images obtained to be processed, said method comprising the steps of:

adjusting the inclination of the image-acquisition system so that the image-acquisition system remains in a permissible angular range, said image-acquisition system compensating for the inclination, so as to obtain an image of the eyes of the individual, which image is always centered on the screen whatever the inclination of said image-acquisition system in the permissible angular range, the compensating being based on an image-processing software package that selects, in the image obtained by the image-acquisition system in which image the face of the individual appears off-center, a zone around the eyes of the individual and a frame of the spectacles, and moves said zone to the center of said screen;

adjusting a height of the image-acquisition system so that the individual can view the target along a substantially horizontal vision axis;

the individual observing the target with the spectacles occupying a natural position on the face of the individual;

providing an enclosure on the screen, the enclosure appearing on the screen as a rectangle of constant size;

acquiring at least one image of the eyes and of the frame in said observation position by mean of the image-acquisition system, when the eyes and the frame fit inside the enclosure;

processing said at least one image using the processor in order to determine each morpho-geometric parameter of the individual from the position of pupils of the individual and the inclination of the spectacles; and returning the results of the measurements.

2. The method as claimed in claim 1, wherein the compensation includes moving each image obtained by the acquisition system to the center of the screen, the direction and the amplitude of movement of each of said images being dependent on the direction of inclination of the acquisition system and on the value of the angle of inclination.

3. The method as claimed in claim 1, wherein the spectacles of the individual are equipped with a clip provided with at least one marker, and the inclination of the frame is evaluated using a single video camera.

4. The method as claimed in claim 1, wherein the inclination of the frame is evaluated by means of two video cameras used in stereoscopic mode.

5. The method as claimed in claim 1, wherein the means for determining the inclination of the image-acquisition system is an inclinometer housed in said system.

6. The method as claimed in claim 1, wherein the information-processing device is provided with an alarm that is triggered when the angle of inclination of the acquisition system departs from the permissible angular range.

7. The method as claimed in claim 1, wherein the permissible angular range is plus or minus 10° about a vertical reference position.

8. The method as claimed in claim 1, wherein the morpho-geometric parameters measured are selected from the group consisting of the height between the pupil and the lower rim of the glass, the pantoscopic angle, the face from the angle of the spectacles and the pupillary distance.

9. The method as claimed in claim 1, wherein said method is implemented by the spectacle wearing individual, who adjusts the position of the image-acquisition system with reference to the pictures displayed by the screen, and utilizes the processor to trigger the image capture and the processing of said images.

10. The method as claimed in claim 1, wherein said method is implemented by an optician placed facing the individual, and who utilizes the image-acquisition system to adjust its position in space, and in that the optician guides the individual and uses the processor to trigger the image capture and the processing of said images.

11. The method as claimed in claim 1, wherein the results of the measurements are displayed on the screen.

12. The method as claimed in claim 1, wherein said method further includes a step of adjusting the distance between the image acquisition system and the face of the individual, so as to ensure that this distance lies in an acceptable range.

13. An information-processing device for implementing the method as claimed in claim 1, wherein said device comprises:
- a processor,
- a target,
- at least one video camera equipped with an inclinometer, and
- a display screen allowing the pictures taken by said video camera and the results of the measurements to be viewed.

14. The device as claimed in claim 13, wherein the position of the video camera and the position of the screen may be adjusted independently of each other.

15. The device as claimed in claim 1, wherein said device includes a tablet combining the screen, a secondary video camera, the inclinometer and the processor, and of said at least one video camera.

16. The method as claimed in claim 1, wherein the compensation includes moving each image obtained by the acquisition system to the center of the screen, the direction and the amplitude of movement of each of said images being dependent on the direction of inclination of the acquisition system and on the value of the angle of inclination.

* * * * *